Nov. 11, 1924.

C. BOUIN 1,515,429

STEREOSCOPIC MOTION PICTURE PROJECTOR

Filed June 23, 1922 4 Sheets-Sheet 1

INVENTOR=
Charles Bouin.

Nov. 11, 1924.

C. BOUIN 1,515,429

STEREOSCOPIC MOTION PICTURE PROJECTOR

Filed June 23, 1922          4 Sheets-Sheet 2

INVENTOR=
Charles Bouin.

Nov. 11, 1924.  1,515,429

C. BOUIN

STEREOSCOPIC MOTION PICTURE PROJECTOR

Filed June 23, 1922  4 Sheets-Sheet 4

INVENTOR=
Charles Bouin.

Patented Nov. 11, 1924.

1,515,429

UNITED STATES PATENT OFFICE.

CHARLES BOUIN, OF BOSTON, MASSACHUSETTS.

STEREOSCOPIC MOTION-PICTURE PROJECTOR.

Application filed June 23, 1922. Serial No. 570,359.

*To all whom it may concern:*

Be it known that I, CHARLES BOUIN, a citizen of the United States, residing at Boston, in the county of Suffolk and State of Massachusetts, have invented certain new and useful Improvements in Stereoscopic Motion-Picture Projectors, of which the following is a specification.

This invention relates to a projector which converges the direction of rays from two images which are at different points of position and distance on film and bringing the rays from such two images to a point of position upon a projection screen which superimposes the two images upon screen.

The invention relates more particularly to the method employed in a projection machine for causing an equal amount of convergence of both right and left images of a stereoscopic pair and also the method employed to adjust film in film gate when images in film gate apertures are not in proper position, also the method employed to cause an equal amount of convergence of film gates and film images on film and maintaining the same relation of film images and film gate apertures in association with each other during process of convergence.

Further objects and advantages of the present invention will be pointed out in the hereinafter following description of one embodiment hereof, or will be obvious to those skilled in the mentioned arts.

Referring to the accompanying drawings.

Figure 1:
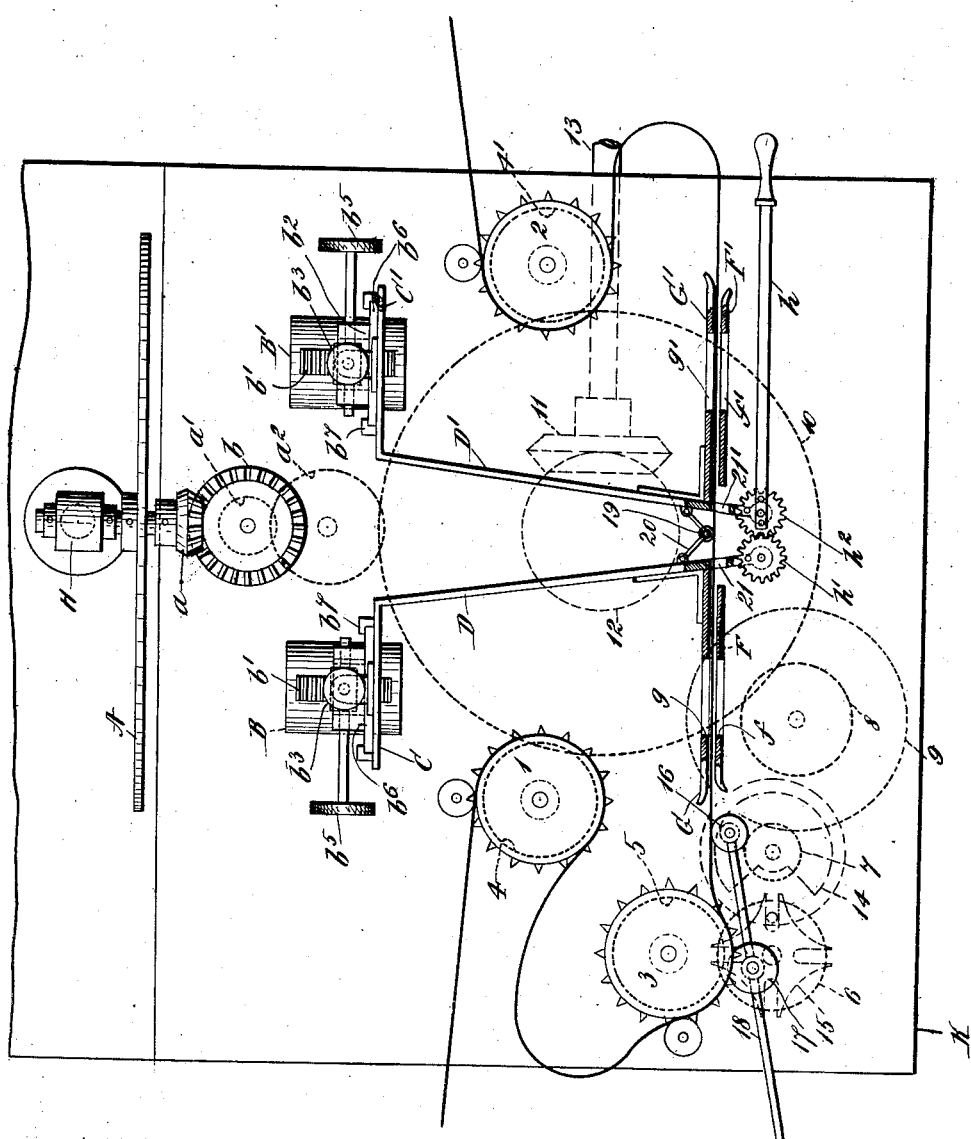
Fig. 1 is a plan view showing method employed in converging different parts of projector, film, and method of adjusting film in film gate.

In Fig. 1, H is a bearing which supports shutter A upon a shaft; A, is a shutter which is placed in front of the right and left projection lenses, the centre of shutter A being half way between both lenses. Shutter A being revolved by means of gears 10 to $a^2$, $a^2$ to $a^1$, $b$ to $a$, gear $a$ and shutter A being on same shaft; B and B' are left and right projection lenses; $b'$ and $b^5$ are racks and pinions; $b^2$ are supports into which thumb screws $b^3$ engage, shaft of thumb screw $b^5$ rests and lens slides are attached; slides $b^6$ being between grooves $b^7$; C and C' are the two forward partitions supporting the left and right slides and lenses respectively; D and D' are the left and right partitions respectively, upon which the left and right film gates are attached; F and F' are left and right pressure plates, $f$ and $f'$ are apertures in said pressure plates; G and G' are left and right film gates, $g$ and $g'$ are apertures in said film gates; $h$ is a handle attached to gear $h^2$, $h^2$ meshing with gear $h'$, gears $h'$ and $h^2$ being attached to partitions D and D' respectively.

One revolution of crank shaft 13 will cause gears 11, 12, and 10 to revolve once, gear 10 in one revolution will revolve gear $a^2$ four times, four revolutions of gear $a^2$ will revolve gear $a'$ eight times, gear $b$ revolving eight times will revolve gear $a$ and shutter A sixteen times.

One revolution of crank shaft 13 will cause gear 10 to revolve gear 8 four times, gears 8 and 9 being on same shaft, four revolutions of gear 9 will revolve gears 7 and 14 sixteen times, gear 14 revolving sixteen times will engage and disengage the maltese-cross 15 sixteen times, maltese-cross 15 and gear 6 revolving $\frac{1}{4}$ of a circumference and resting sixteen times intermittently and gear 6 transmitting said motion to gear 5 and sprocket wheel 3; sprocket wheel 3 having sixteen teeth of standard distance apart and $\frac{1}{4}$ of a revolution of such a sprocket wheel will advance film through film gate one image width of $\frac{3}{4}$ inch; in one revolution of crank shaft 13, sprocket wheel 3 will cause film to be intermittently advanced through film gate sixteen different periods of times a distance of $\frac{3}{4}$ inch at each of said periods.

The distance of advancement of film through film gate may be varied as desired by means of varying the size of gears 6, 5, or sprocket wheel 3.

One revolution of gear 10 will revolve gear 4' and sprocket wheel 2 four times, feeding film gate sixteen image widths of film.

One revolution of gear 10 will revolve gear 4 and sprocket wheel 1 four times, taking in film sixteen image widths of film length.

Considering the converging parts of projector, on the left side, B is a projection lens which is mounted upon a slide $b^6$, slide $b^6$ being between grooves $b^7$, C is the forward partition supporting lens mechanism; D is the innermost partition supporting film gate G; in film gate G is an aperture $g$; F is the pressure plate and $f$ is the pressure plate aperture; 21 is an aperture in partition D through which film passes.

The converging parts on the right side of projector are the projection lens B' which is mounted upon slide $b^6$, C' is the forward partition supporting lens and lens device;
D' is the innermost partition supporting film gate G' which has an aperture $g'$; F' is the pressure plate which has an aperture $f'$; 21' is an aperture in partition D' through which film passes.

At the rear top ends of partitions D and D' a gear is permanently attached to each of said partitions, gear $h'$ being at top rear of partition D, and gear $h^2$ being at top rear of partition D'; said two gears meshing and both gears being exactly the same size; gear $h^2$ having a handle $h$ permanently attached.

Between partitions D and D' are two extensions, one of such extensions, 20, being attached to partition D and the second extension being attached to partition D'; the opposite ends of extensions meeting and connected upon a rod midway between the partitions D and D'; said rod having a roller 19.

In Fig. 1, the projection lenses are shown in a parallel position in relation to each other and represents the point of greatest divergence and from such a parallel position of lenses convergence of the right and left projection lenses is accomplished by means of operating handle $h$; the relation of film in film gate and roller 19, and horizontal alinement of right and left film gates being as indicated in Fig. 1 when the projection lenses are in a parallel position.

At the innermost end of handle extension 18 is a roller 16 and on the inner half of handle extension is a thumb screw 17.

Figure 2:
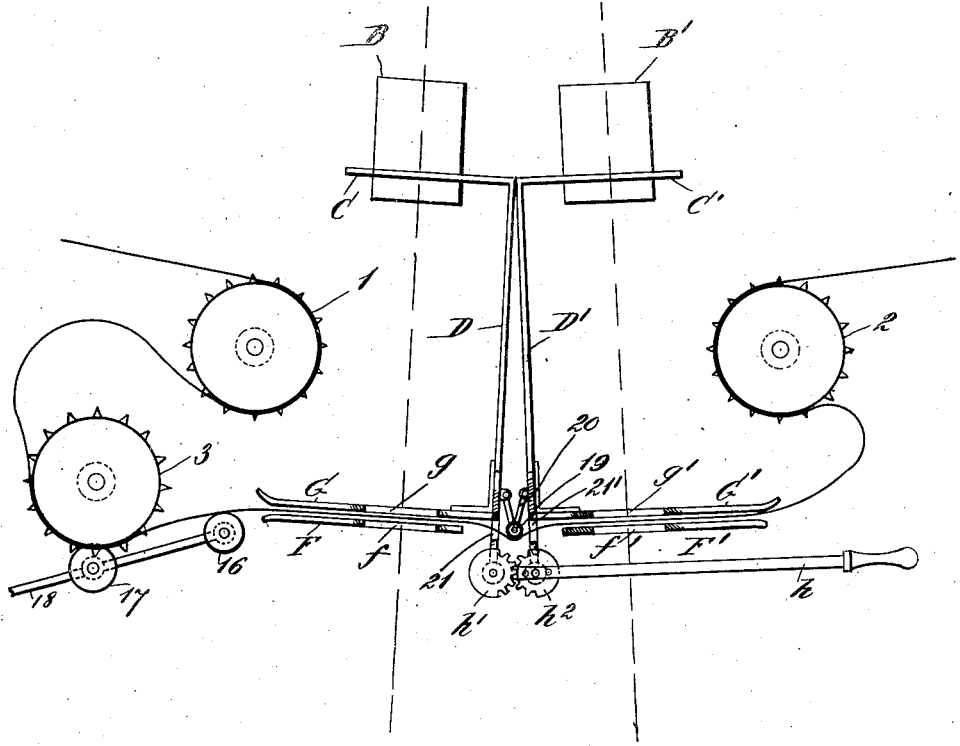
Fig. 2 is a plan view showing different parts of projector and film in a position of greatest convergence.

In Fig. 2, which is a plan view, the point of convergence is shown at its greatest. Handle $h$ having been pushed forward and equally partly rotating gears $h'$ and $h^2$ causes the following to be equally converged; lens B and B', partitions C and C', partitions D and D', film gates G and G', pressure plates F and F', and the two extensions 20.

In the process of convergence the relation of the stereoscopic pairs of images on film to the film gate apertures $g$ and $g'$ are maintained by means of roller 19; roller 19 being pushed backward by extensions 20 a distance sufficient to correct the displacement of images in film gate apertures which may have occurred in the process of convergence.

To adjust film images in film gate apertures, handle 18 is pushed backward or forward, thereby increasing or decreasing the distance of length of film between sprocket wheel 3 and film gate G; bringing handle in a backward direction will cause roller 16 to advance forward and pressing against film will advance film through film gate the desired distance; when the desired adjustment is obtained, thumb screw 17 is tightened to hold the position of roller 16 against film.

Figure 3:
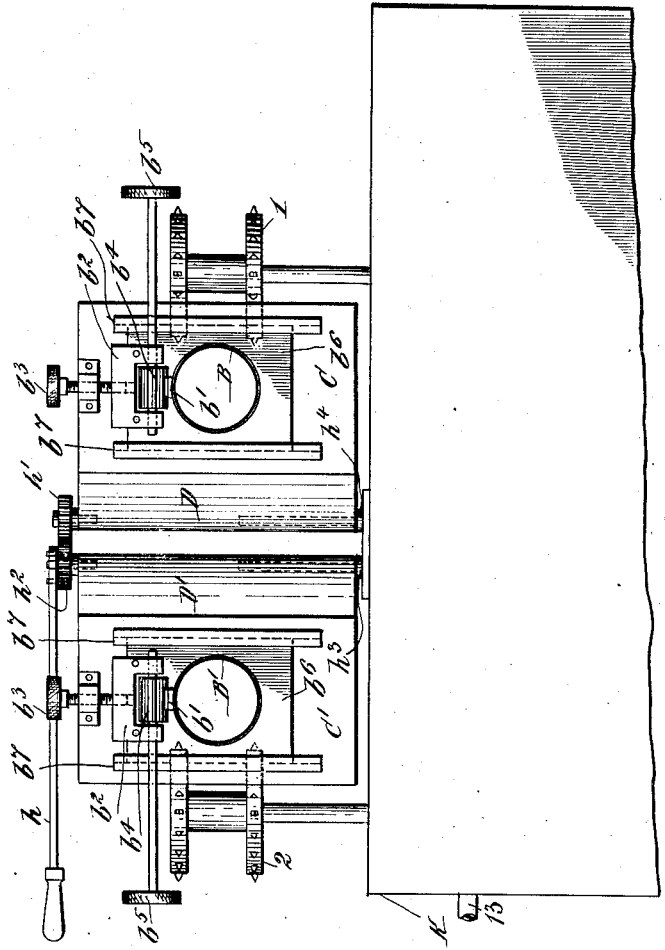
Fig. 3 is a front elevation showing general construction of the front section of projector.

In Fig. 3, which is a front elevation, the lens operating devices are shown. K is a casing in which gears are enclosed and 13 is the crank shaft; $h^3$ and $h^4$ are rods supporting partitions; handle $h$ turning gears $h'$ and $h^2$ will converge partitions D and D' equally; the object of Fig. 3 is principally for showing the means employed to focus and raise or lower the projection lenses to the desired positions; $b^7$ are grooves attached to partitions C and C'; $b^6$ are slides placed between grooves $b^7$; B and B' are left and right projection lenses respectively which are mounted upon slides $b^6$; $b'$ are racks into which gears $b^4$ engage, $b^5$ is a thumb screw for rotating gear $b^4$; $b^2$ is a support for pinion gear shaft and slide $b^6$; in support $b^2$ thumb screw $b^3$ engages.

The projection lenses are brought forward or backward in a focusing position by means of turning thumb screw $b^5$.

The projection lenses are raised or lowered to the desired positions by means of turning thumb screw $b^3$, which engages support $b^2$.

Figure 4:
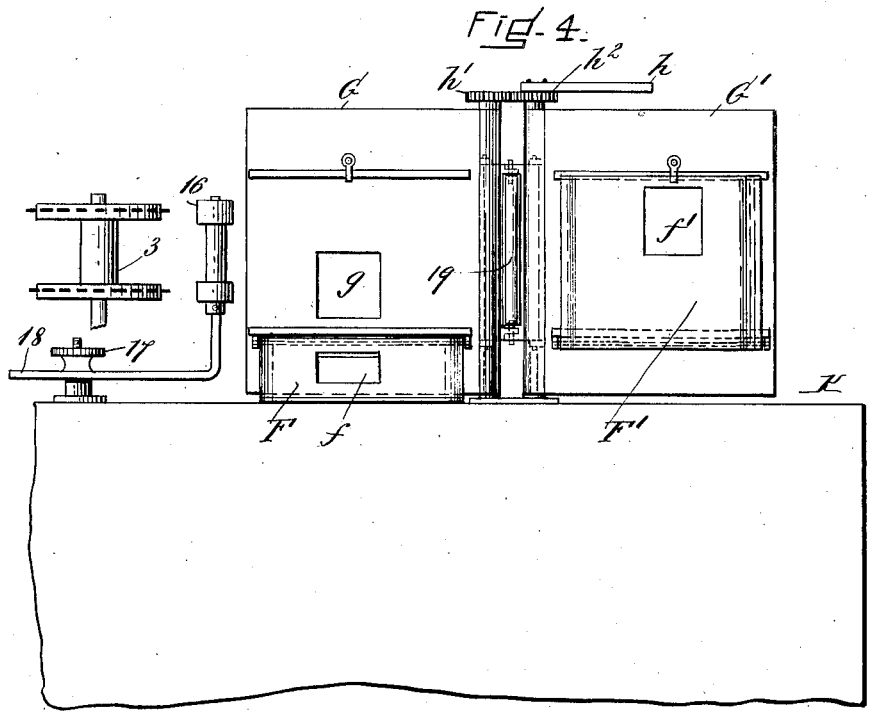
Fig. 4 is a rear elevation showing general construction of the rear section of projector.

In Fig. 4, which is a rear elevation, G is the left aperture plate and G' is the right aperture plate; $g$ is the aperture in left aperture plate, F is the left pressure plate and $f$ is the aperture in left pressure plate, pressure plate is shown open and resting on top cover of casing K; F' is the right pressure plate and $f'$ is the aperture in right pressure plate, the pressure plate is shown closed. The position of apertures as shown in Fig. 4 being suitable for images on film which are above and below horizontal centre of film. 19 is the roller which has been described in Figs. 1 and 2.

In Fig. 4, is shown a rear elevation of sprocket wheel 3 which advances film through film gate, and also is shown the film adjusting mechanism; 18 is the horizontal handle and 16 is the roller on the vertical part of handle extension; by means of handle 18 roller 16 advances film through film gate the desired degree of adjustment and after the desired adjustment is obtained the thumb screw 17 is turned tight against handle extension thereby holding roller 16 in position.

Figure 5:
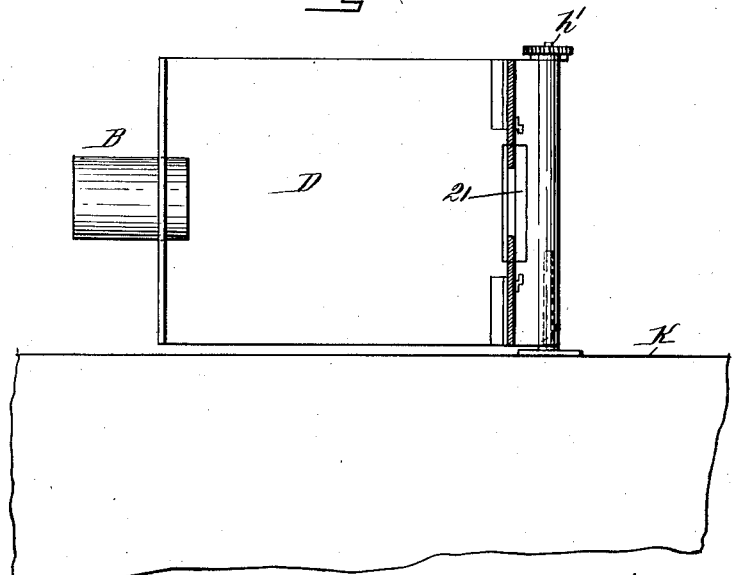
Fig. 5 is a side elevation of a left partition showing an opening through which film travels.

In Fig. 5, is shown a side elevation of left partition D; 21 is an aperture in partition D through which film travels and the width of said aperture of a sufficient degree to allow freedom of film at any and all points of convergence.

I do not confine myself to the particular style of projector or method of causing equal convergence of corresponding parts of such a projector, or method of adjusting or maintaining the position of images in proper relation to film plate apertures here shown, but various other changes and modifications, within the skill of those versed in the mentioned arts may be made in such methods without departing from the spirit of my invention provided the principle set forth in the following claims be employed.

Having thus described my invention, I claim:

1. In a stereoscopic motion picture projector, the combination of a pair of partitions, a projection lens on the forward end of each partition, a film gate on the rear end of each partition in line with the respective lenses, a pressure plate for each film gate for maintaining a film thereacross, intermeshing gears carried on the partitions to cause the simultaneous and equal divergence and convergence of the partitions and elements carried thereby, a handle connected to one of the gears for operating the same, a take up device connected to and arranged between the partitions for adjusting the film on the film gates to automatically maintain registry of the images of the film with the apertures of the film gates, drawing means for a film to pull it through the film gates and including a sprocket wheel, a handle, and a roller carried by the handle in position to engage the film between the gates and the sprocket wheel for varying the length of film therebetween.

2. In a stereoscopic motion picture projector, the combination of a pair of partitions, a projection lens on the forward end of each partition, a film gate on the rear end of each partition in line with the respective lenses, a pressure plate for each film gate for maintaining a film thereacross, intermeshing gears carried on the partitions to cause the simultaneous and equal divergence and convergence of the partitions and elements carried thereby, a handle connected to one of the gears for operating the same, a take up device connected to and arranged between the partitions for adjusting the film on the film gates to automatically maintain registry of the images of the film with the apertures of the film gates, a pair of pivotally connected links pivoted between the partitions and extending toward the path of the film, and a roller carried by the links at their pivoted connecting point and arranged to bear against the film when the partitions are moved toward each other for maintaining an equal length of film between the film gate at all adjustments.

3. In a stereoscopic motion picture projector, the combination of a pair of partitions, a projection lens on the forward end of each partition, a film gate on the rear end of each partition in line with the respective lenses, a pressure plate for each film gate for maintaining a film thereacross, intermeshing gears carried on the partitions to cause the simultaneous and equal divergence and convergence of the partitions and elements carried thereby, a handle connected to one of the gears for operating the same, a take up device connected to and arranged between the partitions for adjusting the film on the film gates to automatically maintain registry of the images of the film with the apertures of the film gates, drawing means for a film to pull it through the film gates and including a sprocket wheel, a handle, and a roller carried by the handle in position to engage the film between the gates and the sprocket wheel for varying the length of film therebetween, a pair of pivotally connected links pivoted between the partitions and extending toward the path of the film, and a roller carried by the links at their pivotal connecting point and arranged to bear against the film when the partitions are moved toward each other for maintaining an equal length of film between the film gate at all adjustments.

This specification signed and witnessed this 19th day of June, 1922.

CHARLES BOUIN.

Witnesses:
MAY R. McEVOY,
MARGARET PEABODY.